United States Patent [19]
Sapack

[11] Patent Number: 6,072,567
[45] Date of Patent: *Jun. 6, 2000

[54] VERTICAL SEISMIC PROFILING SYSTEM HAVING VERTICAL SEISMIC PROFILING OPTICAL SIGNAL PROCESSING EQUIPMENT AND FIBER BRAGG GRAFTING OPTICAL SENSORS

[75] Inventor: Michael A. Sapack, Southbury, Conn.

[73] Assignee: CiDRA Corporation, Wallingford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,208

[22] Filed: Feb. 12, 1997

[51] Int. Cl.$^7$ ................................. G01B 11/16
[52] U.S. Cl. ............................................. 356/32
[58] Field of Search ................... 356/32, 35.5, 33; 250/227.18, 227.15, 231.1, 227.14, 227.16; 73/800, 705; 385/37, 1, 4, 12–14, 45

[56] References Cited

U.S. PATENT DOCUMENTS

| | | |
|---|---|---|
| 4,360,272 | 11/1982 | Schmadel et al. . |
| 4,589,285 | 5/1986 | Savit . |
| 4,649,529 | 3/1987 | Avicola . |
| 4,745,293 | 5/1988 | Christensen . |
| 4,825,424 | 4/1989 | Lamb et al. . |
| 4,950,883 | 8/1990 | Glenn . |
| 4,996,419 | 2/1991 | Morey . |
| 5,051,965 | 9/1991 | Poorman . |
| 5,163,321 | 11/1992 | Perales . |
| 5,317,383 | 5/1994 | Berni . |
| 5,319,435 | 6/1994 | Melle et al. ................. 356/32 |
| 5,327,216 | 7/1994 | Berni . |
| 5,361,130 | 11/1994 | Kersey et al. . |
| 5,380,995 | 1/1995 | Udd et al. . |
| 5,397,891 | 3/1995 | Udd et al. . |
| 5,401,956 | 3/1995 | Dunphy et al. . |
| 5,426,297 | 6/1995 | Dunphy et al. . |
| 5,444,803 | 8/1995 | Kim et al. . |
| 5,451,772 | 9/1995 | Narendran . |
| 5,493,390 | 2/1996 | Varasi et al. . |
| 5,497,233 | 3/1996 | Meyer . |
| 5,675,674 | 10/1997 | Weis . |
| 5,680,489 | 10/1997 | Kersey ......................... 356/35.5 |
| 5,767,411 | 6/1998 | Maron . |

OTHER PUBLICATIONS

"Fiber Bragg Grating Array Sensor System Using a Bandpass Wavelength Division Multiplexer and Interferometric Detection", IEEE Photonics Technology Letters, vol. 8, No. 11, Nov. 1996.

*Primary Examiner*—K. P. Hantis
*Attorney, Agent, or Firm*—Ware, Fressola, Van Der Sluys & Adolphson LLP

[57] ABSTRACT

A system for vertical seismic profiling of an earth borehole includes an optical fiber having a plurality of Bragg grating sensors formed therein, each one of the Bragg grating sensors being tuned to reflect a respective bandwidth of light, each bandwidth having a different respective central wavelength. Each of the Bragg grating sensors are responsive to an input light signal, a static strain, a dynamic strain and a temperature strain for each providing a respective light signal indicative of static and dynamic forces and temperature at a respective sensor location. The physical spacing and wavelength spacing of the Bragg grating sensors are known such that each of the sensing light signals are easily correlated to a specific depth. The Bragg grating sensors are tuned such that when a sensor is subjected to a maximum static strain, maximum dynamic strain, and a maximum temperature strain, the maximum wavelength shift of a respective sensing light signal does not cause the frequency of the sensing light signal to enter the bandwidth of another one of the plurality of Bragg grating sensors.

15 Claims, 5 Drawing Sheets

VERTICAL SEISMIC PROFILING SYSTEM HAVING VERTICAL SEISMIC PROFILING OPTICAL SIGNAL PROCESSING EQUIPMENT AND FIBER BRAGG GRAFTING OPTICAL SENSORS

TECHNICAL FIELD

The present invention relates to fiber optic sensing, and more particularly, to a fiber optic Bragg grating sensor system for use in vertical seismic profiling.

BACKGROUND OF THE INVENTION

Vertical seismic profiling (VSP) is a method of determining acoustic wave characteristics of rock layers in situ. The method includes lowering one or more sensors into a wellbore to a preselected depth. Typically several sensors are spaced apart to allow coverage over a preselected depth interval. A seismic signal is generated at or near the surface of the earth and propagates through the earth to be received by the sensors. These sensors convert the acoustic energy to sensing signals which are transmitted to the surface for suitable processing and recording.

U.S. Pat. No. 4,589,285 to Savit issued on May 20, 1996 discloses a vertical seismic profiling arrangement using optical fiber sensors. In particular, the disclosed system includes an elongated cable having a bi-directional optical fiber transmission link therein. A plurality of acousto-optic seismic sensors, each consisting of one- or multi-turn optical fiber coils, are coupled to the optical fiber transmission length by means of suitable directional optical couplers. The optical fiber coil making up each sensor acts as a resonant optical cavity to certain discrete wavelengths, as a function of the local static pressure environment within the borehole fluid. The resonant discrete wavelength under static conditions is the center or reference wavelength. Under dynamic conditions, the reference wavelength is data modulated (wavelength shifted) by transient pressure variations due to acoustic or seismic signals.

In the system disclosed in U.S. Pat. No. 4,589,285, each of the sensors are tuned to the same wavelength at the surface, and the varying static pressure, based upon the depth of a sensor, sets up a multitude of different wavelength carriers, each associated with a particular sensor, upon which acoustic seismic data can be superimposed. These different carrier wavelengths caused by the varying static pressure are intended to allow multiple sensors to exist on a single string without interfering with one another.

A problem associated with the VSP method disclosed in U.S. Pat. No. 4,589,285 is that the wavelength of any given sensor under static pressure conditions is unknown, and correlation of sensor signals to physical sensors, and therefore sensor depth, is difficult. Further, if the static pressure between two sensors is small, it may be difficult or impossible to differentiate between the signals arising from the individual sensors. Additionally, commercially available techniques for demultiplexing of wavelength division multiplex signals depends upon knowing the individual signal wavelengths and the channel spacing of the signals being received. Therefore, when using the disclosed method it is difficult or impossible to guarantee either the absolute wavelengths or spacings of the signals generated by the sensors. The sensors are exposed to the wellbore environment in order to obtain the wavelength shifts associated with the static pressure variation of the fluid column within the wellbore. However, the hostile high temperature and pressure and corrosive environment of an oil or gas wellbore may adversely affect the sensor string.

It is also known to perform distributed sensing utilizing optical Bragg grating sensors which are intrinsic to an optical fiber, see, e.g., U.S. Pat. Nos. 4,950,883; 4,996,419; 5,361,130; 5,401,956; 5,426,297; and 5,493,390. In such systems, Bragg gratings are utilized to form Bragg grating sensor strings, where each Bragg grating sensor produces a return signal having an optical bandwidth about a central wavelength (Bragg wavelength). The sensor string may be analyzed on a time division multiplex basis wherein return signals from various Bragg gratings in the sensor string are uniquely identified by their position in a pulse train of signals, such as disclosed in U.S. Pat. No. 5,361,130. Alternatively, as disclosed in U.S. Pat. No. 5,401,956, each Bragg grating sensor may have a central reflection wavelength different from that of the other fiber Bragg gratings such that the signals reflected by the Bragg grating sensor string are uniquely identified based on the wavelength of the received signals in a wavelength division multiplex system.

While such distributed fiber Bragg grating sensor systems have been utilized for distributed sensing of strain, temperature or other perturbations, such sensor systems have not been utilized for vertical seismic profiling in an earth borehole. In particular, as described above, an earth borehole of an oil or gas well presents an extremely hostile environment because of the high temperature, pressure and corrosive environment.

There therefore exists a need for an improved system for vertical seismic profiling of an earth borehole which provides highly accurate and reliable indication of seismic conditions while at the same time being resistant to the extremely hostile environment of an earth borehole.

SUMMARY OF THE INVENTION

Objects of the invention include the provision of a system for vertical seismic profiling of an earth borehole utilizing Bragg grating sensors.

A further object of the present invention is to provide such a sensing system which is suitable for vertical seismic profiling over a long depth within an earth borehole and which provides accurate and reliable seismic profiling information which is easily correlated to specific depths.

A still further object of the present invention is to provide such a system which is resistant to damage caused by the high temperature, pressure and corrosive hostile environment of an earth borehole.

According to the present invention, a system for vertical seismic profiling of an earth borehole includes an optical fiber having a plurality of Bragg grating sensors formed therein, each one of the Bragg grating sensors being tuned to reflect a respective bandwidth of light, each bandwidth having a different respective central wavelength, and wherein the plurality of Bragg grating sensors are each responsive to an input light signal, a static strain, a dynamic strain and a temperature strain for each providing a respective light signal indicative of static and dynamic forces and temperature at a respective sensor location.

In further accord with the present invention, the physical spacing and wavelength spacing of the Bragg grating sensors are known such that each of the sensing light signals are easily correlated to a specific depth, and wherein the Bragg grating sensors are tuned such that when a sensor is subjected to a maximum static strain, maximum dynamic strain, and a maximum temperature strain, the maximum wavelength shift of a respective sensing light signal does not cause the frequency of the sensing light signal to enter the bandwidth of another one of the plurality of Bragg grating sensors.

The present invention provides a significant improvement over the prior art. In particular, the Bragg grating sensor string of the invention provides sensing light signals associated with particular sensors which are easily differentiated from one another so that a highly accurate and reliable indication of the vertical seismic profile is provided. Each of the signals are easily differentiated from one another, and are easily associated with a specific depth of a sensor. Additionally, the sensor string of the invention is provided with a sensor string delivery system which protects the sensor string from the hostile environment of an earth borehole, such as an oil or gas well, while at the same time providing a reliable and accurate indication of the seismic signals of interest.

The foregoing and other objects, features, and advantages of the present invention will become more apparent in light of the following detailed description of exemplary embodiments thereof, as illustrated in the accompanying drawings.

DETAILED DESCRIPTION OF THE DRAWINGS

Figure 1:
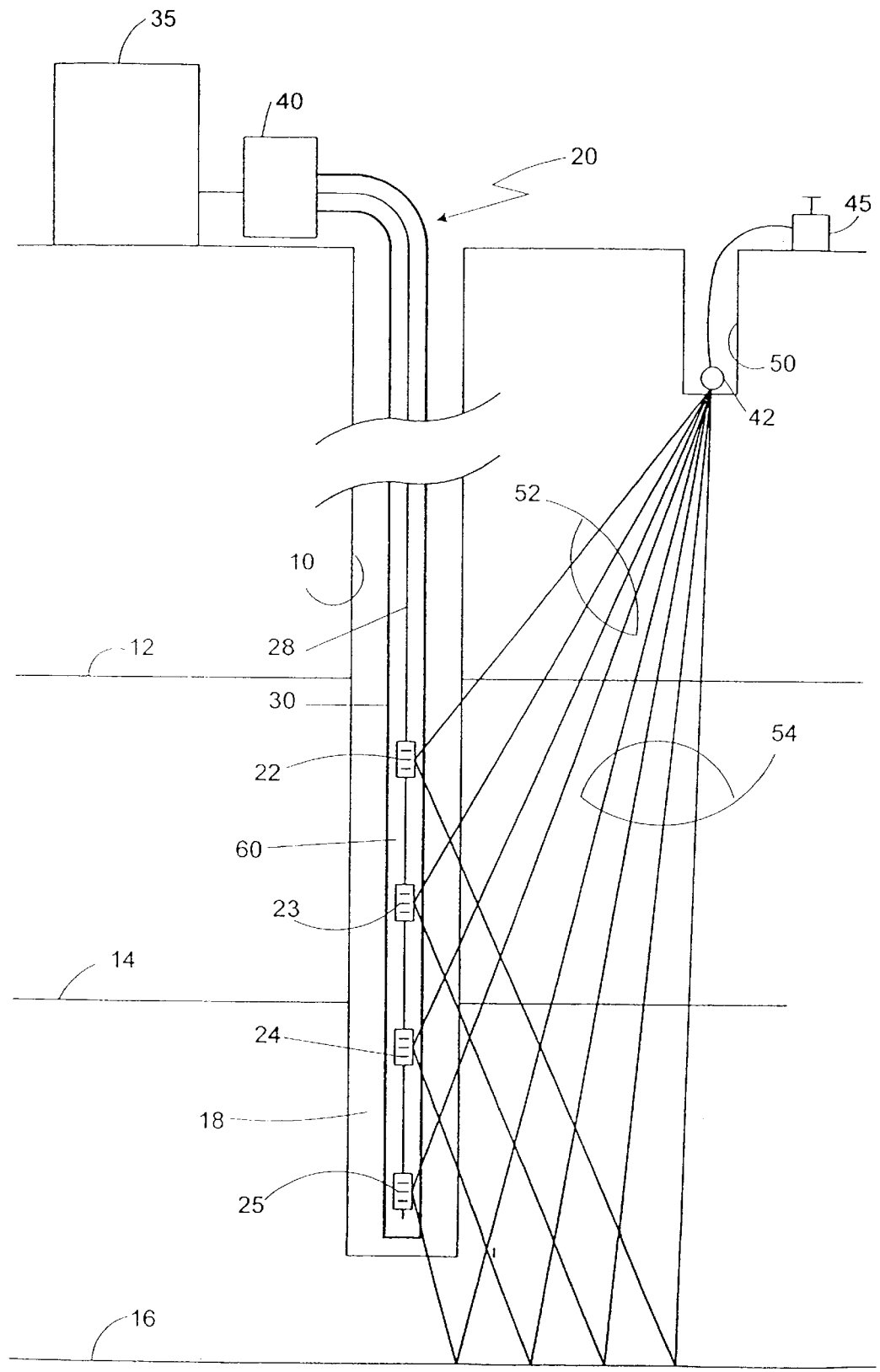
FIG. 1 is a cross-sectional view of an earth borehole having a Bragg grating sensor string of the invention deployed therein for vertical seismic profiling.

Referring to FIG. 1, a borehole 10, such as an oil or gas well, penetrates various earth layers 12, 14, 16. Such a borehole may be fifteen to twenty thousand feet or more in depth. As is known in the art, the borehole is filled with a high temperature and pressure drilling fluid 18 which presents an extremely corrosive and hostile environment.

An optical fiber sensor string 20 includes Bragg grating sensor elements 22, 23, 24, 25 formed within a core 26 (FIG. 2) of an optical fiber 28. The optical fiber 28 is positioned within a capillary tube 30.

Bragg gratings (fiber gratings) are well suited for use as sensor elements. When a fiber grating is illuminated, it reflects a narrow band of light at a specified wavelength. However, a measurand, such as strain induced by dynamic or static pressure or temperature, will induce a change in the fiber grating spacing and/or reflectivity characteristics, which changes the wavelength of the light it reflects. The value (magnitude) of the measurand is directly related to the wavelength reflected by the fiber grating and can be determined by detecting the wavelength or phase shift characteristics of the reflected light.

The optical fiber sensor string 20 is interconnected to optical signal processing equipment 35 via well-known capillary tube delivery equipment 40 for delivering the optical fiber 28 within the capillary tube 30 down the borehole 10. The tubing delivery equipment 40 provides for the delivery of the capillary tubing 30 and optical fiber 28 down the borehole 10, while providing for the delivery of optical signals between the optical signal processing equipment 35 and the optical fiber 28, either directly or via interface equipment (not shown) as required.

For performing the vertical seismic profiling of the invention, the optical fiber sensors are distributed over a known length, such as 5000 feet. Over the known length, the Bragg grating sensors 22, 23, 24, 25 are evenly spaced at a desired interval, such as every 10 to 20 feet, for providing the desired vertical seismic profiling. As described in greater detail herein, each sensor reflects a narrow wavelength band of light having a central wavelength. Each sensor operates at a different wavelength band and central wavelength such that the signals may be easily detected using Wavelength Division Multiplexing (WDM) techniques. The entire optical fiber, positioned within the capillary tube 30, is lowered to a desired depth, for example as measured from the upper most sensor, such as 1,000 feet. An acoustic wave source, such as a small charge of dynamite 42 (a seismic shot), is detonated by a blaster 45 in a shallow shothole 50 that is offset from the borehole 10 by a selected distance, such as 3,000 feet.

Figure 2:
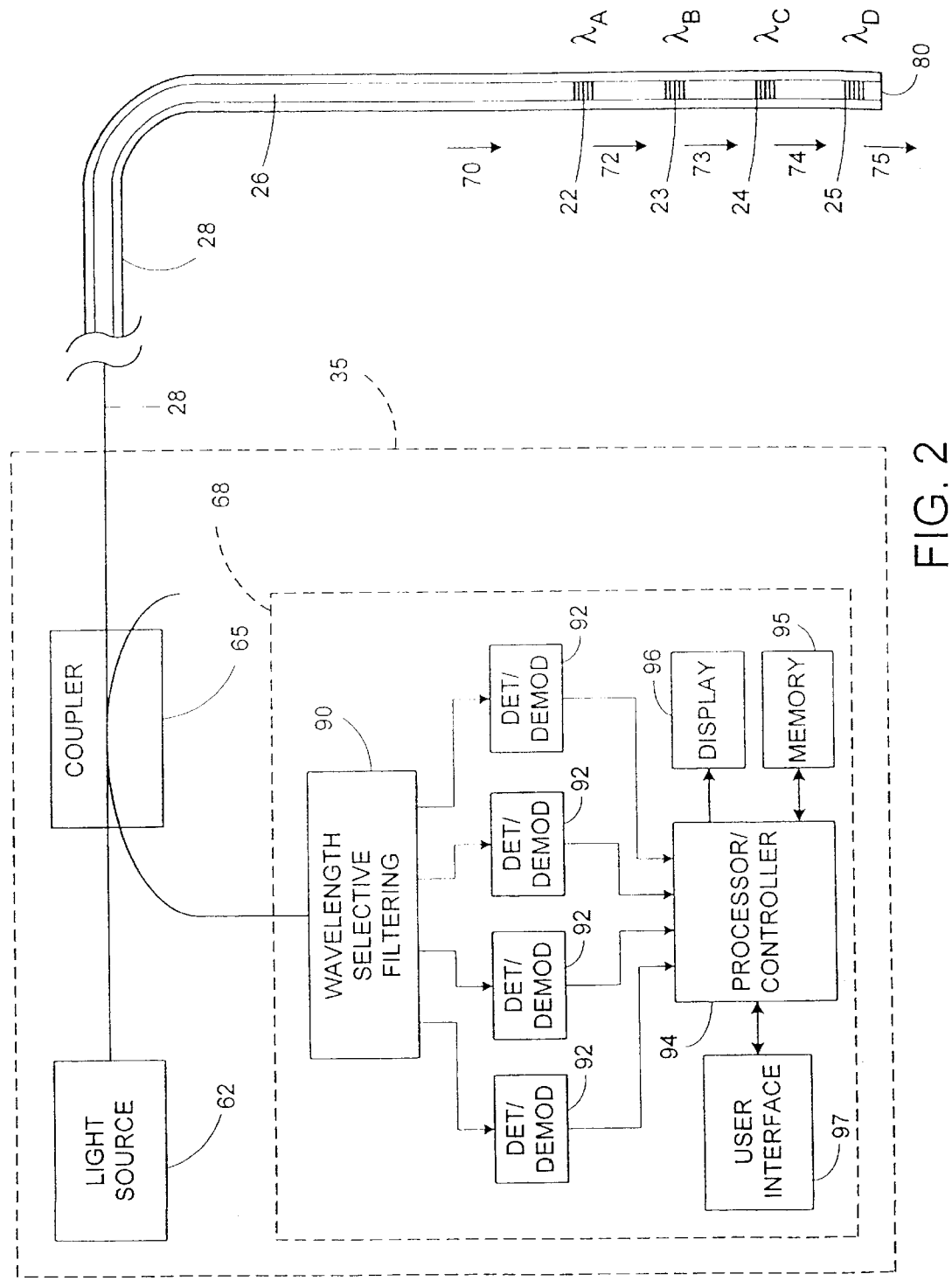
FIG. 2 is a more detailed schematic block diagram of the Bragg grating sensor string of FIG. 1.
Figure 5:
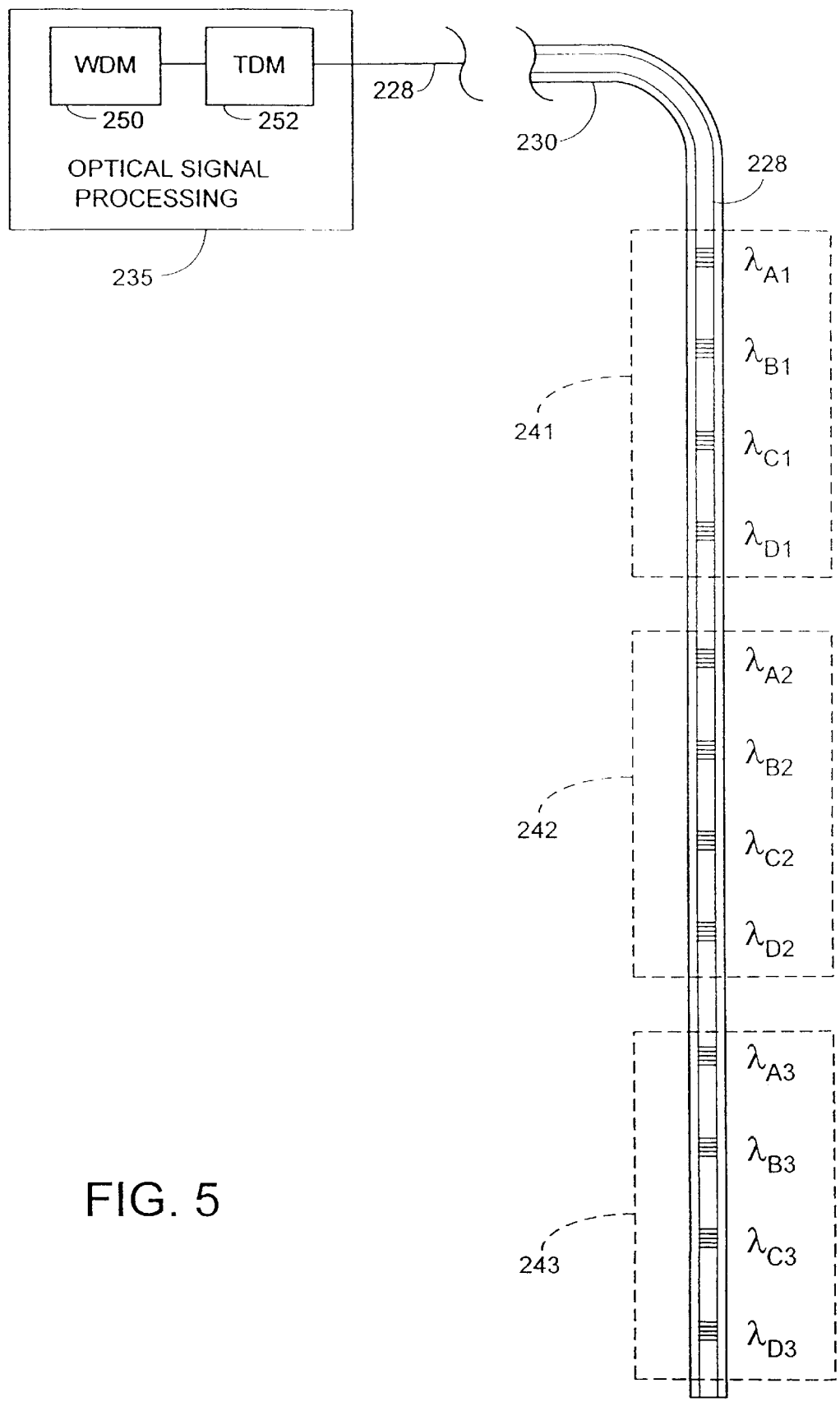
FIG. 5 is a schematic block diagram of a third embodiment of the Bragg grating sensor string of FIG. 1.

In an alternative embodiment of the invention, the fiber may be provided to extend the entire length of the well, e.g., 15,000 to 20,000 feet, with the Bragg grating sensors 22, 23, 24, 25 evenly spaced at desired intervals along the length of the fiber. The sensors may be provided as a single WDM set as illustrated in FIGS. 1 and 2. Alternatively, as illustrated in FIG. 5, a plurality of WDM sets 241, 242, 243 may be combined by Time Division Multiplexing (TDM) sets of the WDM sets. For example, for a 20,000 foot well, 400 sensor points are required for a sensor spacing of 50 feet. This may be achieved for example by a single WDM set of sensors. Alternatively, four sets of sensors each containing 128 WDM sensors may be TDM together for a total of 512 sensors. In this case, a spacing of less than 40 feet between sensors can be used.

Returning to FIG. 2, acoustic waves radiate from the shot along a direct path 52 and a reflected path 54. The reflected waves 54 are reflected off of the various earth layers 12, 14, 16. As will be described in greater detail hereinafter, the direct seismic waves 52 and reflected seismic waves 54 are detected by the sensors 22, 23; 24, 25. Resulting data signals are transmitted through the optical fiber 28 to the optical signal processing equipment 35. In one embodiment of the invention, after the seismic shot, the optical sensor string 20 is repositioned within the borehole for additional seismic profiling. In a second embodiment of the invention, the Bragg grating sensors 22, 23, 24, 25 are distributed over the entire length of the optical fiber 28 such that the entire borehole 10 is characterized in a single shot. In order to improve the transmission of acoustic signals through the capillary tube 30 to the Bragg grating sensors 22, 23, 24, 25 the capillary tube 30 may be filled with a high-density low-compressibility material 60, such as the material disclosed in commonly owned co-pending U.S. patent application Ser. No. 08/777,271 filed on Dec. 31, 1996, the disclosure of which is incorporated herein by reference.

Referring now to FIG. 2, the optical signal processing equipment 35 includes a broadband source of light 62, such as an edge emitting light emitting diode (ELED) or laser, and appropriate equipment for delivery of signal light, such as a coupler 65, to the optical fiber 28 for transmission to the Bragg grating sensors 22, 23, 24, 25 included within the core 26 of the optical fiber 28. Additionally, the optical signal processing equipment 35 includes appropriate signal analysis equipment 68 for analyzing the return signals from the Bragg gratings 22, 23, 24, 25. The broadband light source signal 70 passes through the core 26 of the optical fiber until it reaches the first Bragg grating sensor 22. A Bragg grating sensor, as is known, is a periodic refractive index variation in the core of an optical fiber that reflects a narrow wavelength band of light, has a maximum reflectivity at a central reflectivity wavelength, and transmits all other wavelengths. Thus, when the broadband light source signal 70 is incident on the first Bragg grating sensor 22, a narrow wavelength band of light having a central wavelength $\lambda_A$ is reflected therefrom, and light not reflected is transmitted through the grating 22 as indicated by light 72. The light 72 is incident on a second Bragg grating sensor 23, having a narrow wavelength band of light with a central reflectivity wavelength $\lambda_B$. Light 73 not reflected by the second Bragg grating sensor 23 is transmitted to the third Bragg grating sensor 24. The grating 24 reflects a narrow wavelength band of light having a central reflective wavelength of $\lambda_C$. Light 74 not reflected by the third grating 24 is transmitted to the fourth Bragg grating sensor 25. Again, this Bragg grating sensor 25 reflects a narrow wavelength band of light having a central wavelength $\lambda_D$. The remaining light 75 not reflected by the fourth Bragg grating sensor 25 is provided to the end of the optical fiber 80.

The end 80 of the optical fiber 28 is terminated in an anti-reflective manner, so as to prevent interference with the reflected wavelengths from the Bragg grating sensors 22, 23, 24, and 25. For example, the end 80 of the optical fiber 28 may be cleaved at an angle so that the end face is not perpendicular to the fiber axis. Alternatively, the end 80 of the optical fiber 28 may be coated with a material that matches the index of refraction of the fiber, thus permitting the light 75 to exit the fiber without back reflection, and be subsequently dispersed in the index-matching material.

Figure 4:
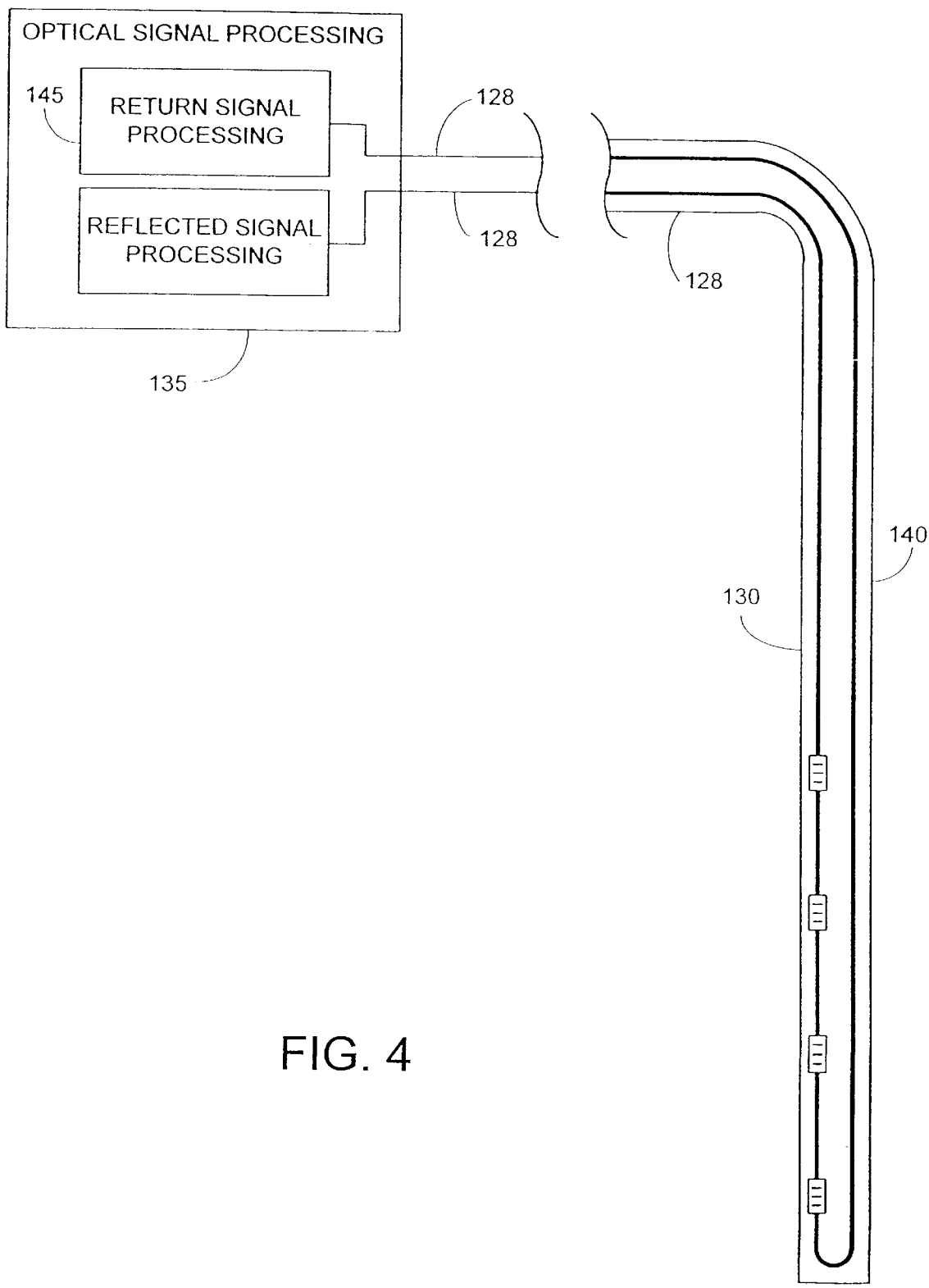
FIG. 4 is a schematic block diagram of a second embodiment of the Bragg grating sensor string of FIG. 1.

Referring to FIG. 4, in another embodiment of the invention, rather than terminating the optical fiber in an anti-reflective manner, the optical fiber 128 may be looped back to the surface within the tube 130. The portion of the fiber 140 returning to the surface may or may not have gratings in it. This return fiber portion 140 may be used to check for fiber integrity by monitoring the entire loop at the optical signal processing equipment 135 to ensure that there are no breaks or degradation of the fiber. Changes in the light not reflected by any of the Bragg gratings and returned to the surface by the return fiber portio 140 may be monitored 145 to detect problems with the fiber. Therefore, variations in the sensor return signals caused by problems with the fiber are easily differentiated from changes in the return signals associated with strain caused by temperature and static and dynamic pressure.

Figure 3:
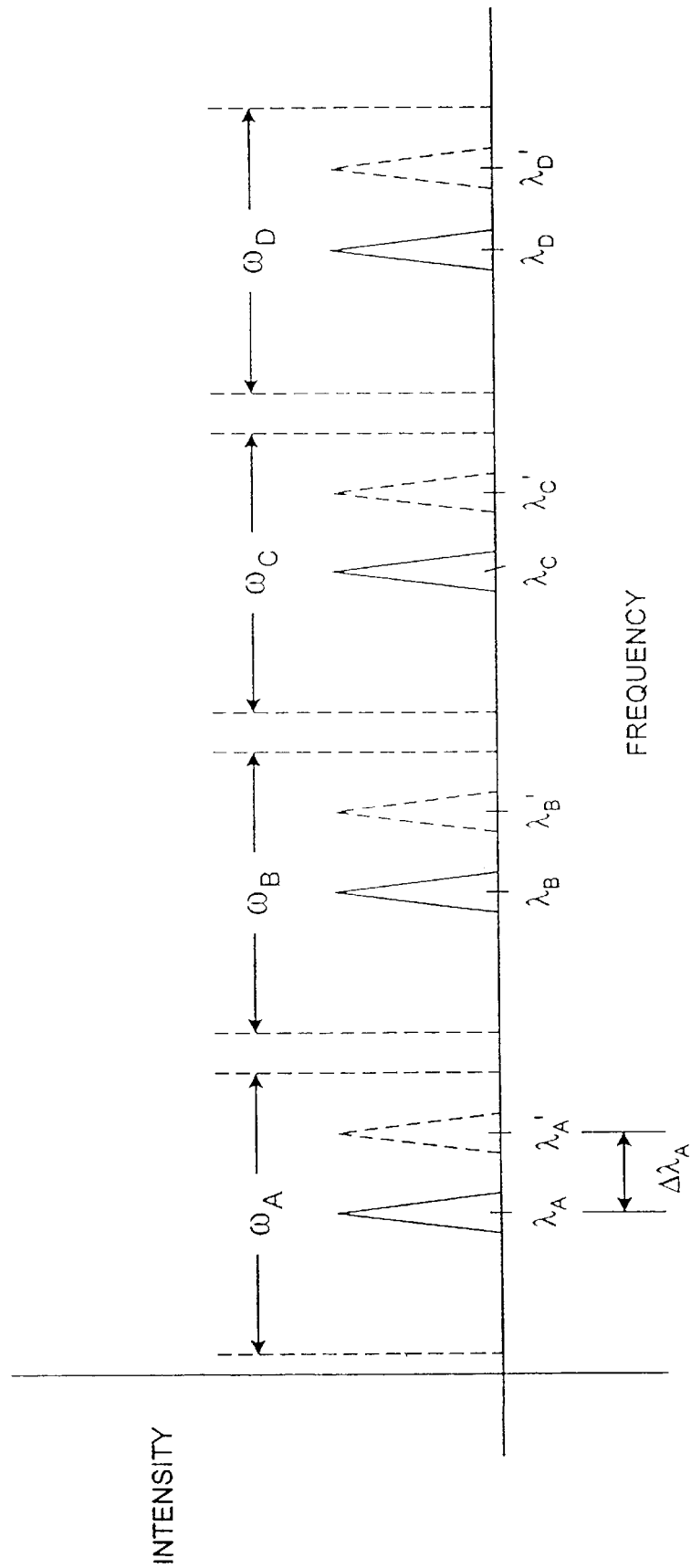
FIG. 3 is a graph showing the reflectivity profile of four Bragg grating sensors.

Referring also to FIGS. 1 and 3, the fiber Bragg gratings 22, 23, 24, 25 will experience strain due to several environmental factors including temperature, static pressure associated with the column of noncompressible fluid 60 within the capillary tube 30, and acoustic pressure associated with the seismic waves 52, 54. As discussed above, these strains will cause a wavelength shift in the central wavelength of the narrow band of light reflected by each Bragg grating sensor. For example, when the first Bragg grating sensor 22 is subjected to the static strain (from the static pressure of the noncompressible fluid) the dynamic strain (from the seismic waves) and the temperature strain, the central wavelength $\lambda_A$ shifts by an amount $\Delta\lambda_A$ to a new central wavelength $\lambda_A'$. Each of the Bragg grating sensors 22, 23, 24, 25 are designed to provide a wavelength spacing such that when the central wavelength of one of the Bragg grating sensors shifts by a maximum amount associated with a maximum dynamic, static and temperature strain, the central wavelength will still be in a desired bandwidth $\omega$ which does not overlap with any of the other Bragg grating sensors. Therefore, as illustrated in FIG. 3, with respect to the first Bragg grating sensor 22, the shifted central wavelength $\lambda_A'$ will always be within a selected bandwidth $\omega_A$ for the Bragg grating sensor 22 which does not overlap with the selected bandwidth $\omega_B$, $\omega_C$, $\omega_D$ of the other Bragg grating sensors 23, 24, 25, respectively.

Referring again to FIG. 2, the reflected optical signals $\lambda_A'$, $\lambda_B'$, $\lambda_C'$ and $\lambda_D'$ are provided via the optical fiber 28 and the coupler 65 to the signal analysis equipment 68. In one embodiment of the invention, the signal analysis equipment 68 is only concerned with the dynamic strain associated with the seismic waves, and therefore, compensation for temperature variation and static pressure is not provided. The seismic measurements are only taken after the sensor string is in place within the borehole and reaches equilibrium temperature and static pressure conditions. Thereafter, any variation in the central wavelength associated with the Bragg grating sensors will be primarily due to the dynamic strain caused by the seismic signals.

In order to separate the responses from the different gratings 22, 23, 24, 25, the return optical signals are directed to a wavelength selective filter or router 90. This device 90 separates the optical signals produced by each Bragg grating by means of selective filtering. The passbands of this device correspond to the selected bandwidths $\omega_A$, $\omega_B$, $\omega_C$ and $\omega_D$ of each of the Bragg grating sensors 22, 23, 24, 25, respectively, to ensure that the optical signals produced by the individual Bragg grating sensors are always passed. In one embodiment of the invention, the wavelength selective filter 90 provides a separate output associated with each sensor to be analyzed using sensitive wavelength or phase discrimination equipment 92 which detects, demodulates and performs wavelength or phase discrimination to determine the wavelength modulation effects due to the seismic waves. Alternatively, a single wavelength or phase discriminator may be provided, and the wavelength selective filtering may be designed to store and forward the frequency response of the individual Bragg gratings such that the wavelength modulation may be determined individually for each Bragg grating sensor.

The output of the sensitive wavelength or phase discrimination equipment 92 is provided to a processor/controller 94 for processing, storage in memory 95, display 96 to a user, or for any other desired use. The processor 94 may be provided with a user interface 97 for user input and control, for example to generate reports illustrating the results of the vertical seismic profiling.

As will be understood by those skilled in the art, the wavelength selective filtering includes wavelength division demultiplexer which is used to separate the wavelength components onto separate fibers which are then each analyzed via separate high resolution wavelength discriminators. An example of the type of wavelength discrimination suitable for this purpose is the interferometric detection approach described in U.S. Pat. No. 5,361,130, the disclosure of which is incorporated herein by reference.

Although a specific embodiment of the optical signal processing equipment is described above, other optical signal analysis techniques may be used with the present invention such as the necessary hardware and software to implement the optical signal diagnostic equipment disclosed in U.S. Pat. Nos. 4,996,419; 5,401,956; 5,426,297; and/or 5,493,390, the disclosures of which are incorporated herein by reference.

As is well known in the art, there are various optical signal analysis approaches which may be utilized to analyze return signals from Bragg gratings. These approaches may be generally classified in the following four categories:

1. Direct spectroscopy utilizing conventional dispersive elements such as line gratings, prisms, etc., and a linear array of photo detector elements or a CCD array;

2. Passive optical filtering using both optics or a fiber device with wavelength-dependent transfer function, such as a WDM coupler;

3. Tracking using a tuneable filter such as, for example, a scanning Fabry-Perot filter, an acousto-optic filter such as the filter described in the above referenced U.S. Pat. No. 5,493,390, or fiber Bragg grating based filters; and 4. Interferometric detection.

The particular technique utilized will vary, and will depend on the Bragg wavelength shift magnitude (which depends on the sensor design) and the frequency range of the measurand to be detected.

As will be further understood by those skilled in the art, the optical signal processing equipment may operate on a principle of WDM as described above wherein each Bragg grating sensor is utilized at a different passband or frequency band of interest. Alternatively, as discussed above, the present invention may utilize TDM, either alone or in combination with WDM, for obtaining signals from multiple independent sensors or multiple independent sets of WDM sensors, or any other suitable means for analyzing signals returned from a plurality of Bragg grating sensors formed in a fiber optic sensor string.

The invention has been described with respect to FIGS. 1 and 2 as providing a single set or group of Bragg grating sensors, wherein each sensor in the group operates in a unique frequency band such that the signals from the individual sensors may be easily identified using wavelength division multiplexing techniques. However, as briefly described above with respect to FIG. 5, multiple sets of Bragg grating sensors may be combined using time division multiplexing techniques. Referring to FIG. 5, three sets of Bragg grating sensors 241, 242, 243 are essentially identical with respect to the number of sensors, the bandwidths of the sensors and the central wavelengths of the sensors. The difference between the sets of Bragg grating sensors 241, 242, 243 is the positioning of the sets along the length of the optical fiber 228. Wavelength division multiplexing optical signal processing equipment 250 is used to differentiate between the signals provided by the individual sensors within a set of sensors. However, time division multiplexing optical signal processing equipment 252 is utilized to differentiate between the signals provided by each set of sensors. This arrangement provides certain advantages. The same optical signal processing equipment 235 may be utilized to analyze the return signal from all of the sets of Bragg grating sensors 241, 242, 243 because the sensor sets utilized the same wavelengths. Therefore, each of the sets requires the same wavelength selective filtering and wavelength or phase discrimination equipment. Time division multiplexing techniques, disclosed for example in U.S. Pat. No. 5,364,180, the disclosure of which is incorporated herein by reference, may be utilized to differentiate between the signals from each of the sets.

In addition to the use of a single reflective grating as a Bragg grating sensor 22, 23, 24, 25, (FIG. 2) as explained herein, an alternate embodiment of this invention can utilize a pair of reflective gratings within the same length of fiber, thus forming a resonant cavity of longer length. Such a resonant cavity will also reflect light of a particular wavelength corresponding to a central wavelength of the reflective gratings. A change in the cavity length due to a static strain, a dynamic strain and/or a temperature induced strain on fiber will result in phase shift in the reflected light due to the change in optical path length within the reflective cavity. Such a device, termed a Fabry-Perot interferometer, can then provide a high sensitivity means of detecting strain in the optical fiber, and the resultant optical phase shift can be detected using standard interferometer instrumentation techniques. Thus, it is possible with this technique to realize a Bragg grating sensor which has enhanced sensitivity. Alternatively, the pair of Bragg gratings may be used to form a lasing element for detection, for example by positioning an Erbium doped length of optical fiber between the pair of Bragg gratings.

Although the invention has been described and illustrated with respect to exemplary embodiments thereof, the foregoing and various other additions and omissions may be made therein and thereto without departing from the spirit and scope of the present invention.

I claim:

1. A vertical seismic profiling system for performing a vertical seismic profile of an earth formation (12, 14, 16) in relation to a borehole (10), comprising:

seismic disturbance force means (42, 45) being arranged at a selected distance from the borehole (10) for providing a seismic disturbance force (52, 54) to be sensed to perform the vertical seismic profile of the earth formation (12, 14, 16) in relation to the borehole (10);

vertical seismic profiling optical signal processing equipment (35, 135), for providing an optical signal, and being responsive to a fiber Bragg Grating optical seismic sensor signal, for further providing vertical seismic profile information about the earth formation (12, 14, 16) in relation to the borehole (10) depending on the information contained in the fiber Bragg Grating optical seismic sensor signal; and an optical fiber having fiber Bragg Grating optical seismic sensors (20, 22, 23, 24, 25, 28) spaced at a desired interval therein, arranged in the borehole (10), and distributed along a selected length of the borehole (10), responsive to the optical signal, and further responsive to the seismic disturbance force (52, 54) in relation to the borehole (10), for transforming the seismic disturbance force (52, 54) into the fiber Bragg Grating optical seismic sensor signal using a direct mechanical-to-optical energy conversion and without using an electrical energy conversion, and for providing the fiber Bragg Grating optical seismic sensor signal containing information about the seismic disturbance force (52, 54) in relation to the borehole (10) to the optical signal processing equipment (35, 135).

2. A vertical seismic profiling system according to claim 1, wherein the vertical seismic profiling optical signal processing equipment (35) further comprises a light source (62), an optical coupler (65) and signal analysis equipment (68);

wherein the light source (62) provides the optical signal;

wherein the optical coupler (65) provides the optical signal to the at least one fiber Bragg Grating optical seismic sensor, and provides the fiber Bragg Grating optical seismic sensor signal to the signal analysis equipment (68); and wherein the signal analysis equipment (68) processes the fiber Bragg Grating optical seismic sensor signal and provides the vertical seismic profile information of the earth formation (12, 14, 16) in relation to the borehole (10).

3. A vertical seismic profiling system according to claim 2, wherein the signal analysis equipment (68) further comprises at least one wavelength selective filter or router (90), wavelength or phase discrimination equipment (92), and a processor/controller (94);

wherein the at least one wavelength selective filter or router (90) separates the fiber Bragg Grating optical seismic sensor signal from fiber Bragg Grating sensors using selective filtering, and provides respective fiber Bragg Grating optical seismic sensor signals;

wherein the wavelength or phase discrimination equipment (92) responds to the respective fiber Bragg Grating optical seismic sensor signals, and demodulates and performs wavelength or phase discrimination thereto; and wherein the processor/controller (94) processes the respective fiber Bragg Grating optical seismic sensor signals and provides seismic survey information of the earth formation (12, 14, 16) in relation to the borehole (10).

4. A vertical seismic profiling system according to claim 3, wherein the signal analysis equipment (68) further comprises a memory (95) for storing signals, a display (96) for providing visual information to a user, and a user interface (97) for allowing user interaction with the seismic survey apparatus.

5. A vertical seismic profiling system according to claim 1, wherein the direct mechanical-to-optical energy conversion converts a wavelength or a phase of the optical signal so the fiber Bragg Grating optical seismic sensor signal contains information about the seismic disturbance force (52, 54) in relation to the borehole (10) to the optical signal processing equipment (35, 135).

6. A vertical seismic profiling system according to claim 1, wherein the vertical seismic profiling system further comprises a capillary tube (30);

wherein the at least one fiber Bragg Grating optical seismic sensor (20, 22, 23, 24, 25, 28) is arranged in the capillary tube (30) and includes an optical fiber sensor string (20) positioned therein having an optical fiber (28) with fiber Bragg Gratings (22, 23, 24, 25) therein; and wherein the vertical seismic profiling system further comprises tube delivery equipment (40) for delivering the at least one fiber Bragg Grating optical seismic sensor (20, 22, 23, 24, 25, 28) with the capillary tube (30) down the borehole (10).

7. A vertical seismic profiling system according to claim 1, wherein the optical signal processing equipment (35, 135) includes a return signal processing means and a reflected signal processing means.

8. A vertical seismic profiling system according to claim 1, wherein the seismic survey apparatus further comprises sets of fiber Bragg Grating sensors (241, 242, 243);

wherein the seismic survey apparatus further comprises an optical signal processing device (235) having wavelength division multiplexing optical signal processing equipment (250) and time division multiplexing optical signal processing equipment (252);

wherein the wavelength division multiplexing optical signal processing equipment (250) differentiates between signals provided by individual fiber Bragg Grating sensors (241, 242, 243) within a respective set of fiber Bragg Grating sensors (241, 242, 243); and wherein the time division multiplexing optical signal processing equipment (252) differentiates between signals provided by each set of fiber Bragg Grating sensors (241, 242, 243).

9. A vertical seismic profiling system according to claim 1, wherein the at least one fiber Bragg Grating optical seismic sensor (20, 22, 23, 24, 25, 28) includes an optical fiber (28) having Bragg Grating sensors (22, 23, 24, 25) therein.

10. A vertical seismic profiling system according to claim 6, wherein the fiber Bragg Gratings (22, 23, 24, 25) are distributed over the entire length of the optical fiber (28) so that the entire borehole (10) is characterized in a single seismic disturbance force (52, 54).

11. A vertical seismic profiling system according to claim 6, wherein the fiber Bragg Gratings (22, 23, 24, 25) are distributed over less than the entire length of the optical fiber (28) so that the entire borehole (10) is characterized in more than one seismic disturbance force (52, 54).

12. A vertical seismic profiling system according to claim 1, wherein the fiber Bragg Grating optical seismic tensors (20, 22, 23, 24, 25, 28) are evenly distributed along a partial length of the borehole (10).

13. A vertical seismic profiling system according to claim 1, wherein the fiber Bragg Grating optical seismic sensors (20, 22, 23, 24, 25, 28) are evenly distributed along an entire length of the borehole (10).

14. A vertical seismic profiling system according to claim 1, wherein the fiber Bragg Grating optical seismic sensors (20, 22, 23, 24, 25, 28) have a physical spacing and a wavelength spacing that are selected so that each of the fiber Bragg Grating optical seismic sensors (20, 22, 23, 24, 25, 28) provides a respective fiber Bragg Grating optical seismic sensor signal that is correlated to a specific depth in the borehole (10).

15. A vertical seismic profiling system according to claim 1, wherein the selected length of the borehole (10) is in a range of 15,000 to 20,000 feet;

wherein the selected distance between the seismic disturbance force means (42, 45) and the borehole (10) is about 3,000 feet; and wherein the known length of distribution of the fiber Bragg Grating optical seismic sensors (20, 22, 23, 24, 25, 28) is about 5,000 feet.

* * * * *

UNITED STATES PATENT AND TRADEMARK OFFICE
CERTIFICATE OF CORRECTION

PATENT NO. : 6,072,567
DATED : June 6, 2000
INVENTOR(S) : Sapack

It is certified that error appears in the above-identified patent and that said Letters Patent is hereby corrected as shown below:

In Column 10, claim 12, line 3, please delete "tensors" and substitute --sensors-- therefor.

Signed and Sealed this

Twenty-seventh Day of March, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

| | |
|---|---|
| PATENT NO. | : 6,072,567 |
| DATED | : June 6, 2000 |
| INVENTOR(S) | : Sapack |

It is certified that error appears in the above-identified patent and that said Letters Patent is hereby corrected as shown below:

Title page,
Item [54], line 5, delete "GRAFTING" and insert -- GRATING --.

Signed and Sealed this

Sixteenth Day of April, 2002

Attest:

JAMES E. ROGAN
*Attesting Officer*     *Director of the United States Patent and Trademark Office*